T. J. SIMMONS.
COTTON ELEVATOR AND DISTRIBUTER.
APPLICATION FILED APR. 11, 1904.

902,921.

Patented Nov. 3, 1908.
2 SHEETS—SHEET 1.

Witnesses:
A. D. Jackson.
D. A. Whisenant.

Inventor,
Thomas J. Simmons

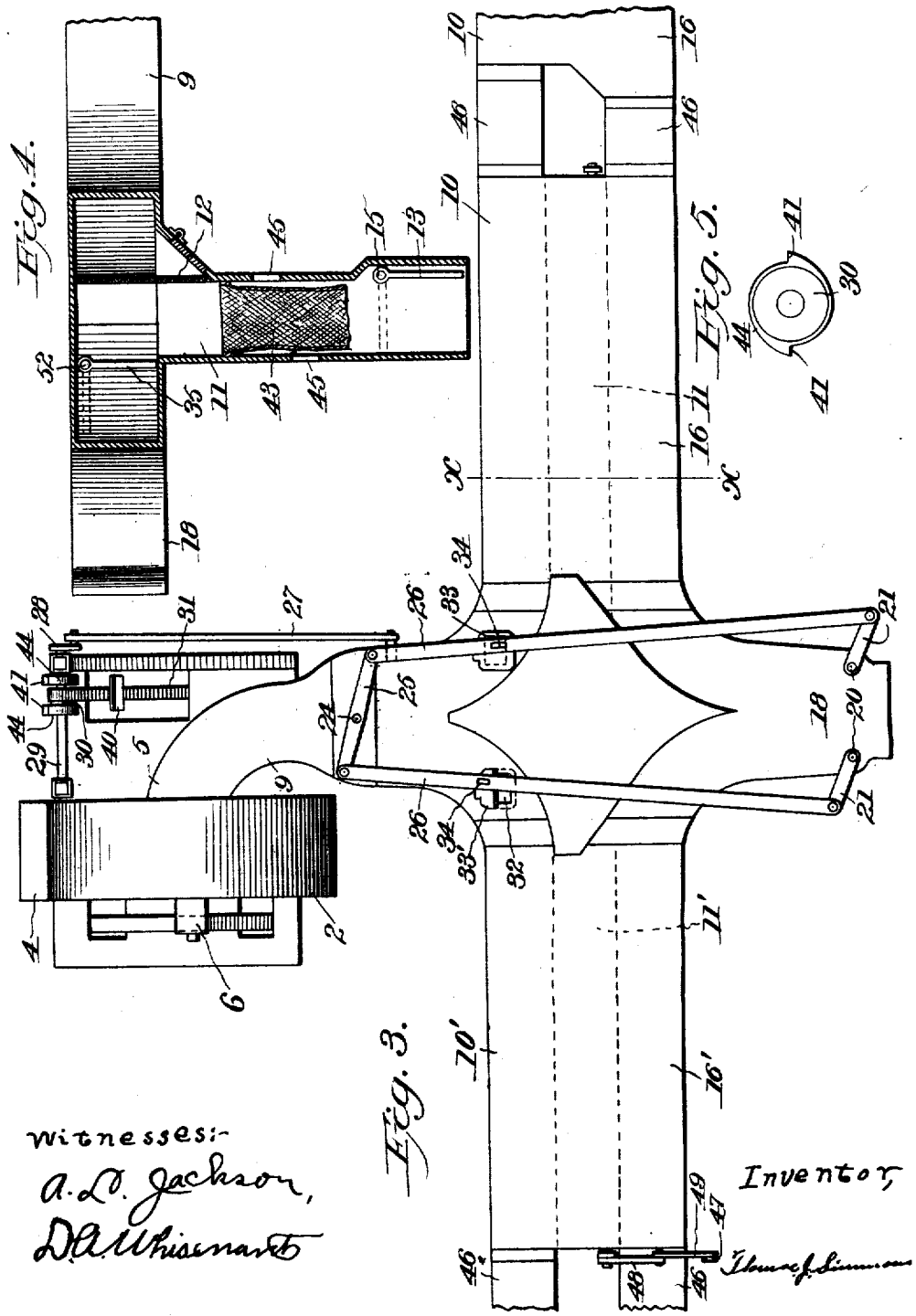

UNITED STATES PATENT OFFICE.

THOMAS J. SIMMONS, OF FORT WORTH, TEXAS, ASSIGNOR TO FORT WORTH GIN MACHINERY COMPANY, OF FORT WORTH, TEXAS, A CORPORATION OF TEXAS.

COTTON ELEVATOR AND DISTRIBUTER.

No. 902,921.  Specification of Letters Patent.  Patented Nov. 3, 1908.

Application filed April 11, 1904. Serial No. 202,665.

*To all whom it may concern:*

Be it known that I, THOMAS J. SIMMONS, a citizen of the United States, residing at Fort Worth, Texas, formerly residing at Comanche, Texas, have invented new and useful Improvements in Cotton Elevators and Distributers, of which the following is a specification.

My invention relates to pneumatic cotton elevators, and the object is to construct a system of elevating cotton for feeding any number of gins.

Another object is to provide an elevator which is provided with valves for maintaining constant suction and which may be continuously in operation, and by which cotton may be delivered to any number of gin stands, and by which the cotton of different owners may be stored in a part of the bin while the cotton of other owners is being ginned by some of the gins. This provision will prevent the loss of time by different parties wanting cotton ginned.

Other objects and advantages will be fully understood from the following description and the invention will be more particularly pointed out in the claims.

Reference is had to the accompanying drawings which form a part of this specification and application.

Figure 1:
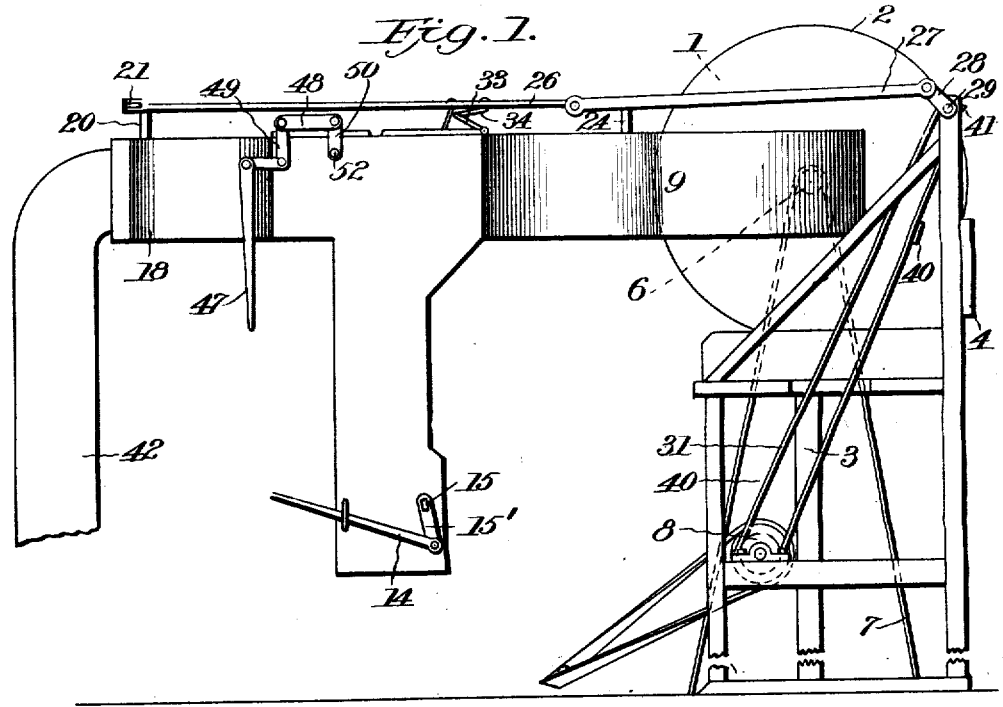
Figure 2:
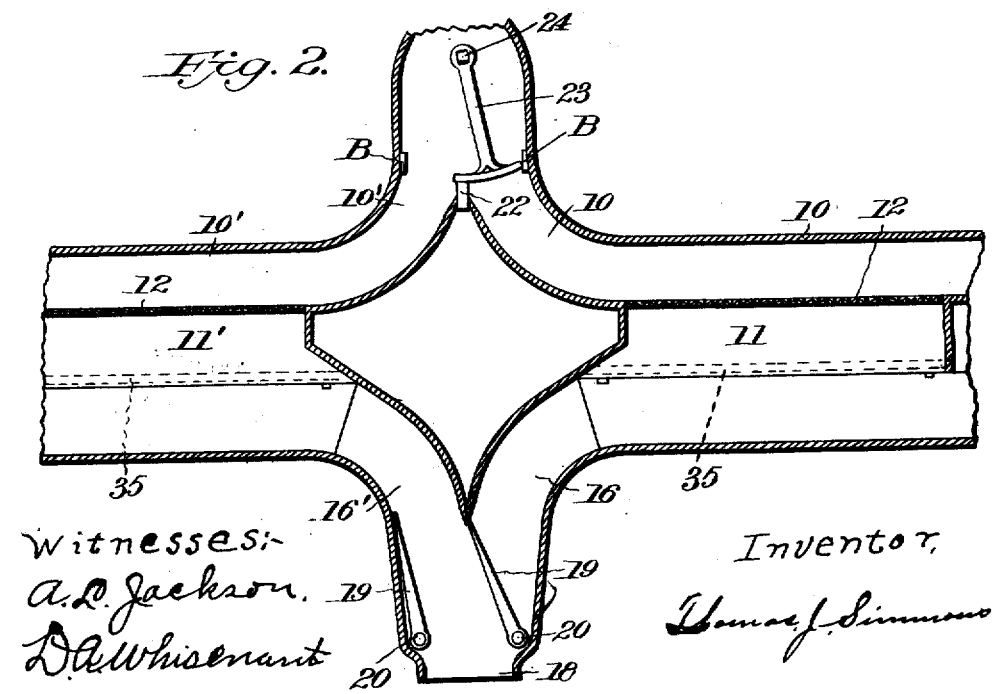

Figure 1 is a side elevation of the apparatus composing my invention. Fig. 2 is a broken horizontal section of the cotton chutes and the air-chutes. Fig. 3 is a plan view of my invention. Fig. 4 is a vertical section along the line $xx$ of Fig. 3. Fig. 5 is a detailed view, illustrating the loose pulley and the cams for operating the switching valves.

Similar characters of reference are used to indicate the same parts throughout the several views.

In carrying out the objects of this invention I make use of a fan 1 inclosed in a casing 2, which casing is supported on a suitable frame-work 3. The fan is provided with an outlet 4 and an inlet 5 which inlet is connected with a pipe 9. The fan is properly a suction fan. The fan may be driven by a belt 7 connected to any suitable driving power, which belt engages a pulley 6. The pipe 9 is divided into branches 10 and 10'. These branches extend to bins 11 and 11'. Screens 12 separate the air-chutes 10 and 10' from the bins 11 and 11', and thus prevent the cotton from entering the air-chutes. Any number of bins may be thus connected with the air-chutes, each bin being provided with a screen 12. Each bin is provided with a swinging door 13 which regulates the passage of cotton to the gin, and a cloth valve 43 prevents the entrance of air into the bin. This valve 43 is open at the bottom and top, and ordinarily stands open, the cotton simply falling down through the valve; but when it becomes necessary to prevent air from entering the bin the valve will collapse; that is, the sides coming together, being forced together by the pressure of the atmosphere coming through the openings 45 in the sides of the bin. In this manner the air is prevented from entering the bin at the bottom. The door 13 is operated by a lever 14, which is connected to a crank arm 15', which crank arm is carried by a shaft 15 which supports the door 13. Each bin is equipped with similar doors.

The cotton is delivered to the bins 11 and 11' by means of chutes 16 and 16', which connect with a mouth-piece 18, and the cotton is taken from the wagons by means of a suitable pipe 42 which extends down to the wagons, as such pipes are commonly made.

I have provided means for distributing the cotton whereby the elevator may be continually in operation and whereby the cotton may be delivered to any bin or gin-stand, the gin-stands on one branch for a pre-determined time and the gin-stands connected with the other branch of the cotton-chute being supplied for a like time, alternately. By means of this invention the cotton of different owners may be stored in bins while the cotton of other owners is being ginned by some of the gins. This is accomplished by the system having separate drafts in each wing of the distributers. Note that the air-chutes and the cotton-chutes are separated from each other by the width of the bins.

The space above the bins and between the cotton-chutes and the draft-chutes may be called a reception chamber. The cotton for each bin is supported in the reception chamber above the bin by pneumatic pressure against the screen 12. With this arrangement the cotton which is accumulated in the reception chamber is not in the way of the passage of the cotton to the next reception chamber. The cotton accumulated in the first reception chamber will cause the next cotton to pass on to the next reception chamber without impairing the efficiency of the draft which is carrying the cotton. The object of this is that any bin in the series of bins may be cut out of the cotton passage by a suitable gate hereinafter described. In the mouth-piece 18 I locate two valves 19 mounted on two shafts 20. These valves are pivotally mounted, and the wings of the valves extend in the direction of the draft of the cotton. The object of this arrangement is to prevent choking of the chutes. Crank arms 21 are mounted on the shafts 20 and pivotally connected to the rods or bars 26. The object of this arrangement is to close one of the valves 19 while the other is being opened and vice versa. These valves are the cotton switching valves and must operate in unison with the draft switching valve 23 which is mounted on the upright shaft 24. There is a bar 25 rigidly mounted on the shaft 24 and pivotally connected to each of the bars or rods 26. The bars 26 are operated by a pitman 27 which is connected to one of the bars 26 and to a crank arm 28 carried by a shaft 29. The shaft 29 is driven by a belt 31 to which are attached cleats 40. The belt 31 runs on a loose pulley 30 and on another pulley which is a part of the gearing 8. There is a fixed wheel or cam 44 on each side of the pulley 30 with two or three teeth 41. The cleats 40 project far enough to each side of the belt 31 to engage the teeth 41 and thus revolve the shaft 29 until the cleats release the teeth 41, after having revolved the shaft 29 approximately 180 degrees. The number of cleats to be used is determined by the number of gin stands in use. It will be noted that the shaft 29 is revolved only when one of the cleats 40 comes in contact with the teeth 41. Whenever the shaft 29 is revolved the valves 19 and the valve 23 are switched in unison. By this mechanism whenever the cotton chute 16 and the air-chute 10 are opened the cotton chute 16' and the air chute 10' are closed simultaneously. In this position the cotton will continue to pass through the chute 16 until one of the cleats 40 revolves the shaft 29. While the shaft 29 is being revolved the chute 16 and the air-chute 10 are being closed, and the chute 16' and the air chute 10' are being opened. Cotton will continue to pass through chute 16' until another cleat 40 rotates the shaft 29. The cotton will then start through chute 16 again and so on. There are two other valves which are operated by the mechanism just described simultaneously with the operation of the cotton switch and the air-chute-switch valves. These are valves 33 and 33'. The object of these valves is to release the pneumatic pressure which holds the cotton suspended above the bins 11 and 11'. As soon as this pressure is released the cotton which is suspended over the bins 11 and 11' will drop immediately in the bins. Apertures 32 are formed in the top of the air-chutes 10 and 10' and are provided with flap valves 33 and 33' which are connected to bars 26 by means of links 34. The valve 33 is so connected to bar 26 that this valve will be opened whenever the chute 16 and draft 10 are closed and vice versa, and the valve 33' is so connected to the bar 26 immediately thereabove that this valve will be opened whenever the chute 16' and the draft 10' are closed and vice versa: consequently when valve 33 is opened valve 33' is closed and vice versa. When the chute 16 and the air-chute 10 are closed, the cotton over the bins 11 which are in communication with chute 16 would be held suspended by pneumatic pressure if the valve 33 should not be opened. The opening of the valve 33 releases the pneumatic pressure and the cotton falls immediately. The valve 33' performs a similar function for the bins 11' in communication with the chute 16'. Any suitable number of bins may be located in communication with chute 16 for as many gin stands, and any suitable number of bins may be placed in communication with chute 16' for as many gin stands. The size of the draft fan and the cotton chutes must be regulated to adapt them for more or less gin stands. It will be noted that the draft chutes and the cotton chutes are all in the same plane. By such arrangement the force of the drafts is not impaired by turning corners to pass to different planes.

I have improved the cotton chutes relative to their communication with the bins 11 and 11'. Each bin 11 or 11' may be cut off from the main passage of the cotton chute by means of a gate 35 which is mounted between the upper part of each bin and the main passage of the cotton chute. This gate can be closed whenever there is a need of repair of the bin, or the gin, or other fixture connected with the particular bin affected. The gate 35 is operated by a lever 47 which is provided with suitable links 48, 49, and 50, the link 50 engaging the shaft 52 which carries the gate 35. When one passage is closed by a gate the cotton can pass on along the chute to the next passage to a bin. The advantage of having the cotton chutes and the air chutes separated from each other a space equal to the width of the bins can now be understood. The advantage of having the cotton chutes and the draft chutes in the same plane will now be better understood. It can now be understood how the cotton of one owner may be stored in some bins while the cotton of another is being ginned in the same system or gin plant. The gates 35 may be opened or closed to throw the cotton in any particular bins desirable. There is no limit to the size of the bins. The cotton may be stored in certain bins and the gins under such bins thrown out of gear while other gin stands are running. A given quantity of cotton may be stored or delivered to two bins, one on each side of the center of the system, or one in connection with each of the opposite branches of the chutes, and then two other bins similarly situated can be filled. Such a provision will be of considerable advantage to different parties having cotton to be ginned. When additional bins are to be added to each wing of the system of cotton distribution, the cotton and air chutes are continued by suitable connections 46, thus bridging the space between the cotton and air chutes for the added bins and the cotton and air chutes for the preceding bins.

The location of the cleats 40 may be varied to adapt the elevator to deliver cotton to a variable number of gin stands. By properly locating the cleats 40, cotton may be delivered to one gin stand on one branch of the cotton chute and to two gin stands on the other branch of the cotton chute. The cleats 40 can be so located on the belt 31 that cotton can be delivered longer on one side of the elevator than on the other.

The draft switch valve 23 is adapted to come to rest alternately against the cushions B attached to the sides of the chute and against the valve seat 22 which is preferably made of rubber so that the valve will make an air-tight closing.

Having fully described my invention, what I claim as new and desire to secure by Letters Patent, is,—

1. A cotton elevator and distributer comprising a cotton chute having oppositely extending branches, a suction fan, draft chutes communicating with said cotton chutes and united to each other to form a single chute connected with said fan, said chutes being all in the same plane, means for operating said fan, and means for directing cotton through said cotton chute branches alternately.

2. A cotton elevator and distributer for delivering cotton to a plurality of gin stands comprising a cotton chute having oppositely extending branches, cotton bins in connection with said branch chutes, a suction fan, draft chutes in communication with said branch cotton chutes and united to form a single chute connected with said fan, said draft chutes being separated from said cotton chutes a distance equal to the width of said bins and being on the same plane with said cotton chutes, means for operating said fan, and means for directing cotton through said branch cotton chutes alternately.

3. A cotton elevator and distributer for delivering cotton to a plurality of gin stands comprising a cotton chute having oppositely extending branches, cotton bins in connection with said branch chutes, a suction fan, draft chutes in communication with said branch cotton chutes and united to form a single chute connected to said fan, cotton reception chambers between said cotton chutes and said draft-chutes, means for operating said fan, means for directing the cotton to said branch chutes alternately, and means for permitting the cotton to drop in said bins.

4. A cotton elevator and distributer for delivering cotton to a plurality of gin stands comprising a cotton chute having oppositely extending branches, cotton bins in connection with said branch chutes, a suction fan, draft chutes in connection with said branch chutes and united to form a single chute connected to said fan, means for driving said fan, means for directing cotton to said branch chutes alternately, pneumatic pressure release valves for preventing air from passing from said bins to said chutes, and means for permitting cotton to fall in said bins.

5. In a cotton elevator and distributer for delivering cotton to a plurality of gin stands, a cotton chute having oppositely extending branches, a suction fan, draft chutes communicating with said cotton chutes and united to form a single chute connected to said fan, cotton reception chambers in connection with said cotton chutes between said cotton-chutes and said draft-chutes, bins in connection with said chambers, and means for directing cotton through said branch chutes intermittently and alternately.

6. A cotton elevator and distributer comprising a cotton chute having oppositely extending branches, cotton switch valves mounted in at the division of said chute, bins in connection with said branch chutes, a suction fan, draft chutes in communication with said branch chutes in the same plane and united to form a single chute connected to said fan, a draft switch valve mounted in the juncture of said draft chutes, means for operating said fan, a pneumatic pressure release valve for each bin and means for operating said valves intermittently whereby cotton is directed to said branch cotton chutes intermittently and alternately and delivered to said bins.

7. A cotton elevator and distributer for delivering cotton to a plurality of gin stands comprising a cotton chute having oppositely extending branches, cotton bins in connection with said branch chutes, a draft chute communicating with each branch cotton chute, means for creating drafts through said chutes, said draft chutes being united to form a single draft chute and cotton being supported in said branch cotton chutes by pneumatic pressure, a cotton switch valve for each branch cotton chute located at the division of said cotton chute, a draft switch valve located in and at the juncture of said draft chutes, a pneumatic pressure release valve for each branch cotton chute, and means for actuating said valves in unison whereby cotton is directed to each branch chute alternately and each pneumatic pressure release valve is opened immediately on the closure of a cotton switch valve.

8. In a cotton elevator, the combination, of a suction fan, a plurality of cotton bins, chutes connected to each of said bins and to said suction fan, flap valves mounted over apertures in the casing of said chutes, a valve located at the junction of said chutes and pivoted on a shaft bearing arms, cotton chutes connected to said bins, two shafts bearing cranks and valves located at the junction of said chutes, connecting rods connecting said cranks and said arms, means for operating the said valves and means connecting said flaps to said connecting rods, substantially as described.

9. In a cotton elevator, the combination of a suction fan, two series of cotton bins, a draft chute in communication with each series of cotton bins and the two draft chutes being united to form a single chute connected to said fan, a shaft bearing a valve located at the juncture of said chutes, crank arms on said shaft, a cotton chute divided into lateral branches, each branch having communication with one series of said bins and the cotton being supported in said branch chutes by pneumatic pressure, two crank shafts each bearing a valve located near the division of said branch cotton chute and each shaft being provided with a crank, rods operatively connected to said cranks and to said crank arms, a pneumatic pressure release valve for each branch cotton chute operatively connected to said rods, and means for actuating said rods to operate said valves in unison to regulate the draft and to regulate the supply of cotton to the bins and to open and close said pneumatic pressure release valves.

10. A cotton elevator for delivering cotton to a plurality of gin stands comprising a cotton chute having oppositely extending branches, bins in connection with said branch chutes, a suction fan, draft chutes in communication with said branch cotton chutes and united to form a single chute connected to said fan, means for driving said fan, cotton switch valves mounted at the division of said cotton chute, a draft switch valve mounted at the juncture of said draft chutes, a pneumatic pressure release valve for the bins in connection with each of said branch cotton chutes, and mechanism for actuating all of said valves in unison in the manner described.

11. A cotton elevator for delivering cotton to a plurality of gin stands comprising a cotton chute having oppositely extending branches, bins in connection with said branch chutes, a suction fan, draft chutes in communication with said branch cotton chutes and united to form a single chute connected to said fan, means for driving said fan, cotton switch valves mounted at the division of said cotton chute, a draft switch valve mounted at the juncture of said draft chutes to coöperate in unison with said cotton switch valves, a pneumatic pressure release valve for the bins in connection with each of said branch cotton chutes, and means for actuating all of said valves simultaneously, whereby the chutes on one side of said elevator are closed while the chutes on the other side are all opened and the pneumatic pressure release valve for the closed side is opened and the pneumatic pressure release valve for the opened side is closed.

12. In a cotton elevator and distributer provided with a cotton chute having oppositely extending branches and draft chutes in communication with said branch cotton chutes and united in a single draft chute and bins in connection with said branch chutes, means for delivering cotton through said branch chutes alternately consisting of a valve for each of said branch cotton chutes located in and at the division of said cotton chute and having its wing extending in the direction of the draft of cotton, a draft valve located at the juncture of said draft chutes, and means for actuating said valves in unison whereby one branch cotton chute and the co-acting draft chute are closed while the other branch cotton chute and the co-acting draft chute are opened and vice versa.

13. A cotton elevator and distributer for delivering cotton to a plurality of gin stands comprising branch cotton chutes and co-acting draft chutes, bins in connection with said branch chutes means for opening one branch cotton chute and the co-acting draft chute and simultaneously closing the other branch cotton chute and its co-acting draft chute alternately, and a pneumatic pressure release valve for each set of branch chutes whereby the pneumatic pressure in each set of branch chutes is released immediately, after each set of branch chutes is closed.

In testimony whereof, I set my hand in the presence of two witnesses, this 11th day of March, 1904.

THOMAS J. SIMMONS.

Witnesses:
A. L. JACKSON,
D. A. WHISENANT.